US011455666B2

(12) United States Patent
Yu et al.

(10) Patent No.: US 11,455,666 B2
(45) Date of Patent: *Sep. 27, 2022

(54) METHOD AND SYSTEM FOR UNUSUAL USAGE REPORTING

(71) Applicant: OPower, Inc., Redwood Shores, CA (US)

(72) Inventors: Janet Yu, San Francisco, CA (US); Tom Mercer, San Francisco, CA (US); Eric Chang, Menlo Park, CA (US); Richard Tyler Curtis, Washington, DC (US); Daniel J. Yates, Washington, DC (US)

(73) Assignee: OPower, INC., Redwood Shores, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/062,686

(22) Filed: Oct. 5, 2020

(65) Prior Publication Data

US 2021/0073875 A1 Mar. 11, 2021

Related U.S. Application Data

(63) Continuation of application No. 13/765,045, filed on Feb. 12, 2013, now Pat. No. 10,796,346.

(Continued)

(51) Int. Cl.
*G06Q 30/02* (2012.01)

(52) U.S. Cl.
CPC ......... *G06Q 30/0283* (2013.01); *G06Q 30/02* (2013.01)

(58) Field of Classification Search
CPC .... G06Q 50/06; Y02B 70/3225; Y02B 60/50; Y04S 20/222; Y04S 10/54
See application file for complete search history.

(56) References Cited

U.S. PATENT DOCUMENTS

2003/0110103 A1\* 6/2003 Sesek ................... G06Q 10/087
705/28
2003/0120452 A1 6/2003 Doel
(Continued)

OTHER PUBLICATIONS

Berges Gonzalez, M. E. (2010). A framework for enabling energy-aware facilities through minimally-intrusive approaches (3438459). Available from ProQuest Dissertations and Theses Professional. (845717143). Retrieved from https://dialog.proquest.com/professional/docview/845717143?accountid=131444 (Year: 2010).\*

(Continued)

*Primary Examiner* — Michael P Harrington
(74) *Attorney, Agent, or Firm* — Kraguljac Law Group, LLC

(57) ABSTRACT

Illustrative embodiments are directed to methods and computer systems for reporting unusual or anomalous usage a commodity by consumers. A computer system retrieves a set of usage-information datasets corresponding to a set of consumers, each dataset including past usage of the commodity during at least one of a completed billing period and a current usage of the commodity during the current billing period. The computer system establishes a set of report-trigger conditions for the current billing period, each of the report-trigger conditions corresponding to a consumer. The computer system may monitor usage or spending of the set of consumers to determine, for each consumer, whether an estimated usage established for each consumer fulfills the consumer's report-trigger condition. Once the report-trigger condition is fulfilled, the computer system outputs a report to the consumer.

20 Claims, 11 Drawing Sheets

Related U.S. Application Data

(60) Provisional application No. 61/722,334, filed on Nov. 5, 2012, provisional application No. 61/665,189, filed on Jun. 27, 2012.

(56) References Cited

U.S. PATENT DOCUMENTS

| | | |
|---|---|---|
| 2007/0203860 A1 | 8/2007 | Golden et al. |
| 2011/0153103 A1 | 6/2011 | Brown et al. |
| 2011/0313964 A1 | 12/2011 | Sanchey Loureda et al. |
| 2012/0215369 A1 | 8/2012 | Desai et al. |

OTHER PUBLICATIONS

The brattle group; net benefits of smart meters could range from $96 to $287 million over 20 years for utilities with a million customers according to study led by the brattle group. (Mar. 1, 2011). Technology & Business Journal Retrieved from https://dialog.proquest.com/ (Year: 2011).

Calico energy services; calico energy solution to enable Chicago suburb to realize a city-wide, energy-efficient smart grid. (Feb. 11, 2011). Energy Weekly News Retrieved from https://dialog.proquest.com/professional/docview/848719225?accoutid=131444 (Year: 2011).

* cited by examiner

METHOD AND SYSTEM FOR UNUSUAL USAGE REPORTING

CROSS REFERENCE TO RELATED APPLICATIONS

This disclosure is a continuation of U.S. Non-Provisional application Ser. No. 13/765,045 filed Feb. 12, 2013, entitled "Method and System for Unusual Usage Reporting", issued as U.S. Pat. No. 10,796,346 on Oct. 6, 2020; which claims the benefit of U.S. Provisional Patent Application Ser. No. 61/665,189 filed Jun. 27, 2012 and U.S. Provisional Application Ser. No. 61/722,334 filed Nov. 5, 2012, and assigned to the present assignee, which are all incorporated by reference herein in their entirety.

TECHNICAL FIELD

The present disclosure is related to commodity-use reporting, more particularly to detecting and reporting of consumer's commodity usage.

SUMMARY

In accordance with illustrative embodiments, a computer-implemented method is provided for reducing a usage or cost of a commodity by reporting to consumers of their unusual usage of the commodity during a current billing period. The computer system retrieves a set of usage-information datasets corresponding to a set of consumers. Each dataset may include a) past usage of the commodity during at least one of a completed billing period that may correspond to a period of similar seasonality as the current billing period and b) a current usage of the commodity during a completed portion of the current billing period. The commodity refers to a utility-based commodity, such as electricity, water, gas, or an aggregation of several resources, such as total energy.

In one embodiment, the computer system establishes a set of report-trigger conditions for a set of consumers for the current billing period, each of the report-trigger conditions corresponding to a consumer. In the various embodiments, the computer system may establish the report-trigger condition once for each billing period, such as at the start of the current billing period or before. The report-trigger condition may include at least one unusual usage condition and at least one permissive condition. An unusual usage condition may be defined as an estimated usage for the current bill period exceeding a specified percentage of a baseline defined based on the past usage. This specified percentage may be between 100 percent and 150 percent. An unusual usage condition may also be defined as an estimated usage for a remaining portion of current billing period exceeding a usage threshold defined by the past usage scaled by the specified percentage. Unusual usage conditions may further be defined in terms of an expected cost or an environmental impact. A permissive condition may include a) the consumer's consent to receive the report, b) the report being the first to be sent within the billing period, and c) the unusual condition occurring in an actionable window during the billing period. This actionable window maybe during portions of the billing period that the user may act to curb their usage. For example, in a four-week billing period, the actionable window may include the second and third week of that period.

The computer system may continuously or intermittently monitor usage or spending of the set of consumers to determine, for each consumer, whether their estimated usage, established for each consumer, fulfills their respective consumer's report-trigger condition. The computer system may determine the estimated usage based on a) usage for the completed portion of the current billing period and b) a forecast of the usage for the remaining portion of the current billing period. The forecast may be based upon a moving or trailing history window that may vary between a five-day and ten-day period.

Upon the estimated usage fulfilling the report-trigger condition for a respective consumer, the computer system outputs a report to the consumer. The report may include generating an electronic message or outputting a signal to an intermediary service that sends the report to the consumer. The computer system may transmit, or cause the transmission of, the report to an electronic device (e.g., cell phone, computer, laptop, etc.) associated with a receiving consumer as an electronic message, such as short message services (SMS), automated voice-messaging service, and electronic mail ("e-mail"). Alternatively, the computer system may transmit, or cause the transmission of, electronic signals to electronic devices located at a consumer's premises to be displayed or relayed and then displayed to the consumer. These electronic devices may include thermostats or a utility meters that communicate with a device operating as a user portal at the premises. The report may include the unusual usage of the commodity such as unusual high cost, unexpected costs, high usage, or higher than expected environmental impact and/or carbon footprint, which may be measured based on previous usage or costs of the consumer and/or comparisons to similar consumers.

In accordance with other embodiments, the computer-implemented method is configured to detect an unusual usage by the consumer of the commodity, where the measured usage takes into account cost. The method may include retrieving a set of usage-information datasets where each of the dataset may correspond to the usage of the commodity by a consumer. The computer system may retrieve a cost-rate dataset for the current billing period, which may be price-tiers or time-of-use pricing. The computer system may establish a set of report-trigger conditions for a set of consumers for the current billing period where each of the report-trigger condition corresponds to a respective consumer. The report-trigger condition may be derived from the past usage data and the pricing data. The report-trigger condition may include a usage-trigger condition and a cost-trigger condition. The computer system may determine, for each consumer, whether an estimated cost that has been established for the respective consumer for that current billing period fulfills the cost-trigger condition, e.g., the estimated cost exceeds an unusual cost setpoint. The computer system may also determine whether an estimated usage established for the same consumer has also been exceeded (i.e., a usage-trigger condition). The computer system may output or cause to output a report to the consumer if both the usage-trigger and the cost-trigger conditions are fulfilled.

The described method may be employed as a computer program product, which is stored on a machine-readable medium, comprising executable program code to be executed, particularly, by a computer.

BRIEF DESCRIPTION OF THE DRAWINGS

The foregoing features of embodiments will be more readily understood by references to the following detailed description, taken with reference to the accompanying drawings, in which.

DETAILED DESCRIPTION

Providing an alert of unusual or anomalous utility usage allows consumers to promote conservation by reducing resource consumption, and to manage theft finances. Consumers may set thresholds of when an alert or report would be sent to them. However, the thresholds by themselves are insufficient in curbing consumers' usage and spending behavior. For example, the threshold may trigger an alert or report that may be late. When a significant portion of the billing period remains, the consumers may need to continue to spend or use the commodity. Consumers may set a lower threshold in order to receive an earlier warning. However, in order to do so, the consumers would have to understand their usage patterns to set the proper setpoint. Further compounding this problem is the variability in the consumers' usage patterns and the effects from seasonality. Importantly, reducing resource consumption (e.g., usage of electricity) causes less power to be drawn from an electricity grid, which causes less power to be generated by an electrical power system. This improves the efficiency of the power system. It is understood that when too much power is consumed and drawn from the electrical power system, a power outage may occur in the electrical power system. Power outages, black outs and brown outs are technical problems and very undesirable. Reducing resource consumption by targeting users with usage reports causes energy reduction and helps to avoid a power outage. This improves the power system.

Illustrative embodiments are directed to computer-implemented methods and systems for reporting unusual or anomalous usage of a commodity by consumers. In various illustrative embodiments, a report is provided to the consumers or to a utility or report service provider to relay to the consumers. The report may be electronic or may be generated as a physical hard copy that is mailed to the consumers. Illustrative embodiments further define usage patterns that constitute as being unusual while accounting for seasonality and allowing for the earlier detection of certain usage to curb the consumers' usage or spending.

As used herein, the term "report" generally refers to a signal that results in a visual or an audible indication. Report also refers to the transmission of a signal that results in the giving of such an indication.

The term "usage" refers to a quantity of use, a cost associated with the use, or a quantified metric representing the use or cost, such as environmental impact.

The term "commodity" refers to a utility-based commodity, such as electricity, water, and natural gas, which are consumable finite resources delivered to a fixed structure. Commodity also refers an aggregation of such resources, such as total energy.

Figure 1:
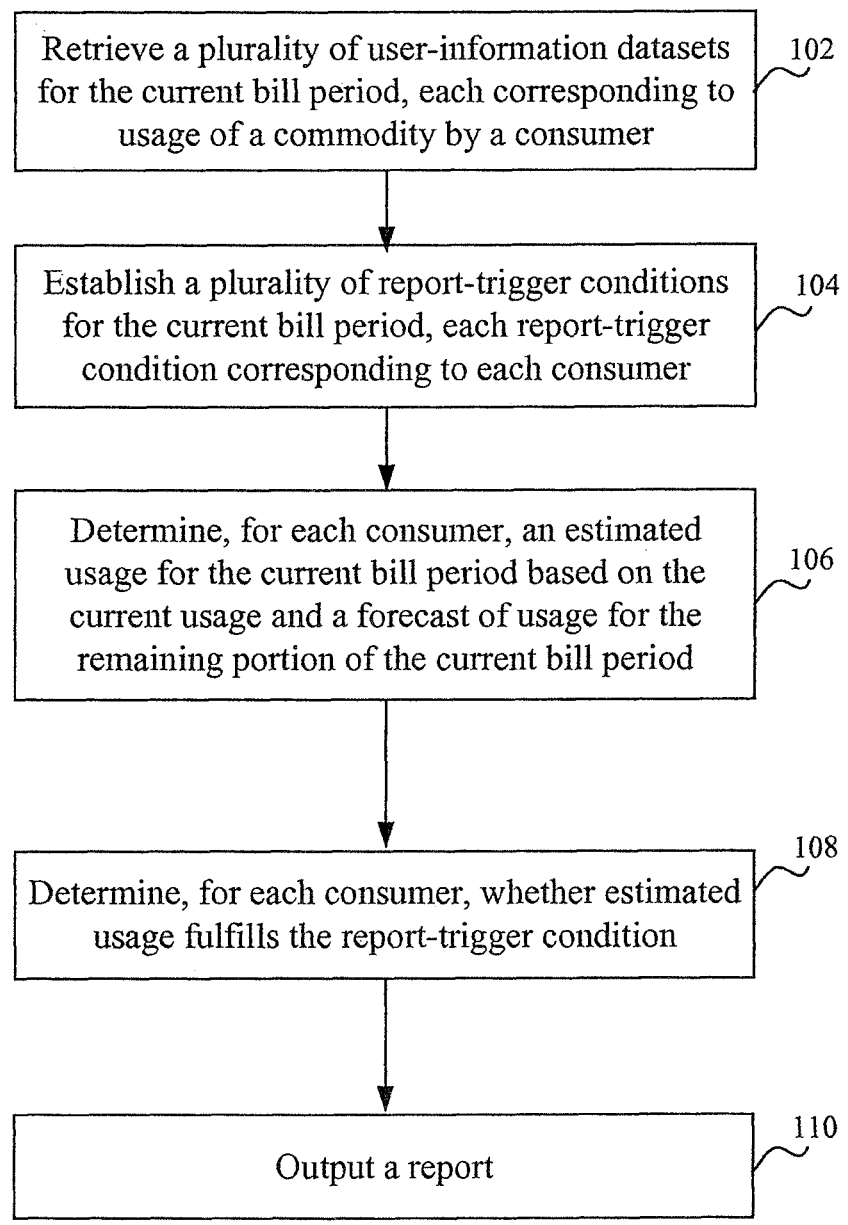
FIG. 1 is a flowchart illustrating a computer-implemented method of reducing a usage or cost of a commodity by reporting to a consumer of an unusual usage of the commodity according to the illustrative embodiment.

FIG. 1 is a schematic flowchart illustrating a computer-implemented method 100 of reducing a usage or cost of a commodity by reporting to a consumer of an unusual usage of the commodity according to the illustrative embodiment. The operation is performed during and for a current billing period. Typically, a utility company bills a consumer at the end of a usage period. As such, the current billing period refers to the time in which the consumer is consuming the commodity to be billed.

The method includes a computer system retrieving 102 a set of usage-information datasets, each corresponding to the usage of the commodity by a set of consumers. For example, the usage-information dataset may include a) past usage of the commodity for a completed billing period and b) a current usage of the commodity during a completed portion of the current billing period.

The computer system may retrieve past usage data from a consumer's old utility bills. These old utility bills may be referred herein as completed billing periods. These bills may be stored in a database operated by the utility, by an archival provider, or by a service provider that sends the unusual usage report to the consumer. Past usage data may also be stored-meter readings that correspond to consumption of the commodity by the consumer.

The current usage of the commodity refers to the most recent, i.e., the last reading (or the last series of readings), from a usage monitoring device (i.e., a utility meter). Current usage may be referred in temporal terms, such as being within the last hour or day. The meter reading may be performed by a utility company or an independent service provider that provides the meter reading to the utility.

The computer system may perform this monitoring operation at a defined schedule during the billing period, such as at every hour, fractions of the hour or day, daily, or weekly. Alternatively, the computer system may perform this monitoring operation at specified events, such as when new usage data is retrieved from the meter or made available from a utility database. The computer system may also perform the monitor operation at a specified portion of the current billing period, such as during the middle of the billing period.

In the various embodiments, the computer system may retrieve current usage data from a database. The current usage data may be a meter reading, but may also be other usage collection device on the premises, such thermostats, sub-meters, and energy management systems.

Past usage for a consumer may also be derived from other consumers. In instances where a consumer has a limited usage history, such as at the beginning of a new service with the utility company, the computer system may use historical usage data of other consumers that have similar home characteristics to form the past usage for this new consumer. These home characteristics may include information, such as size of the premises (in square feet), number of occupants, general age of the premises, dwelling type, presence of a pool, meter reading cycle, distance from each other, and geographic location. In such embodiments, the computer system may analyze datasets of multiple consumers having several or all of these characteristics. Alternatively, the utility company may have estimates of past usage based on geographic location. These estimates may also serve as past usage data for new consumers.

Figure 2A:
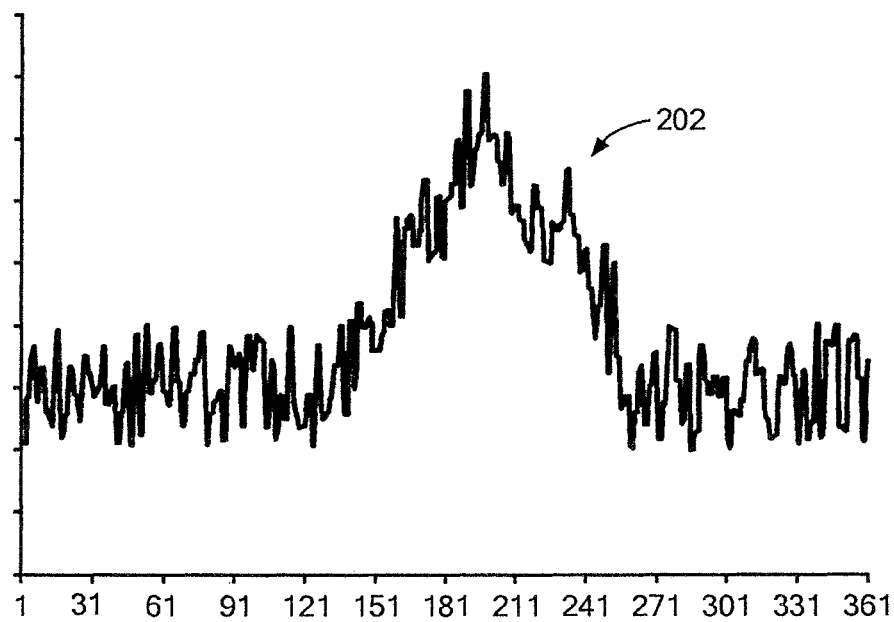
FIG. 2A shows a plot of a daily usage of electricity far a given consumer over a given year.
Figure 2B:
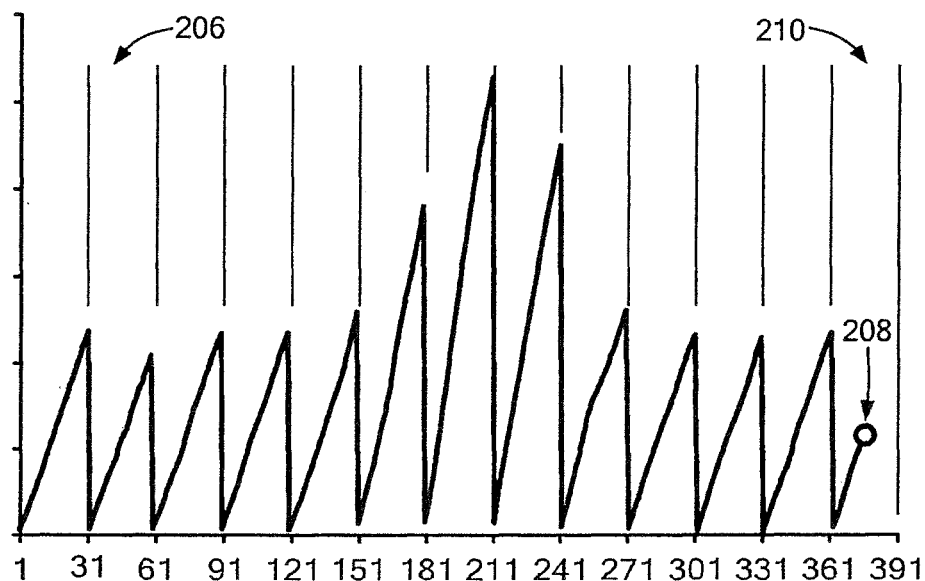
FIG. 2B shows the usage of FIG. 2A cumulated for each billing cycle.

Generally, a premises is equipped with a meter to monitor the usage of the commodity at the premises. A utility company providing the commodity to the premises typically performs a read of the meter in each billing cycle, typically on a monthly basis. FIG. 2A shows a sample plot of a daily usage 202 of electricity for a given consumer over a given year, FIG. 2B shows the usage of FIG. 2A cumulated for each billing cycle 206. The current usage 208 of the present billing period 210 may be referred to as the current usage of the commodity during a completed portion of the current billing period.

The computer system may establish 104 a report-trigger condition for the current billing period at the beginning or before the period, preferably before the beginning of the period. Alternatively, the report-trigger condition may be established during the current billing period, such as immediately before the report-trigger condition is used in the monitoring for unusual usage. This report-trigger condition is based at least in part from the past usage in the usage-information dataset.

Figure 3:
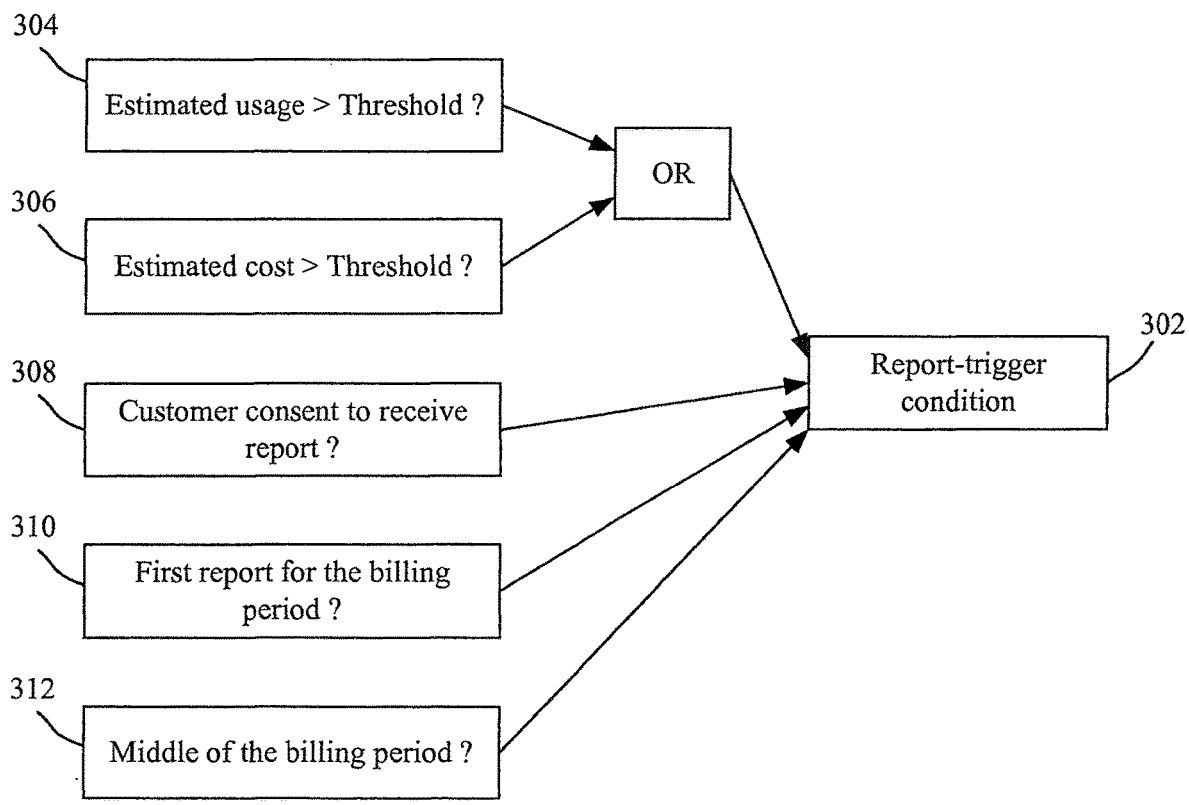
FIG. 3 is a diagram of report-trigger conditions according to the illustrative embodiment.

FIG. 3 is a diagram of report-trigger conditions according to the illustrative embodiment. The report-trigger condition 302 may include a set of conditions, such as triggering conditions as well as permissive conditions. A triggering condition refers to the unusual or anomalous condition to be monitored. More than one triggering conditions may be in a report-trigger condition. For example, a triggering condition may be based upon usage, cost, and/or environmental impact. The triggering conditions may be independently employed or in combinations. A triggering condition 304 based on usage may be defined by Eqn. 1, where the triggering condition is the actual usage of the commodity, $U^i$ actual, exceeding the unusual usage profile, $U^i_{unusual}$, at "time i."

$$\text{Triggering condition} = U_{actual}^i > U_{unusual}^i \quad \text{(Eqn. 1)}$$

The actual usage, $U^i$ actual, of the commodity generally refers to a meter reading or a usage reading. The variable "time i" refers to instances of time during the current billing period. It may be expressed in synchronous intervals, such as by minutes, tenth of an hour, quarter of an hour, hours, or days. For example, "time i" may be in 15-minute increments. Alternatively, the variable "time i" may be asynchronously acquired. R may, for example, be expressed in terms of event identifiers, such as when the meter or usage is read.

The unusual usage profile is the triggering condition that defines an unusual usage. It may be defined by Eqn. 2, where the profile is a baseline historical usage, $U_{historical}$, scaled by a threshold percentage, $T_{percentage}$. The historical usage, $U_{historical}$ serves as a baseline. The profile may be linear over the number of days in the billing period, N.

$$U_{unusual}^i = \frac{U_{historical} \times T_{percentage}}{N} \quad \text{(Eqn. 2)}$$

Figure 11:
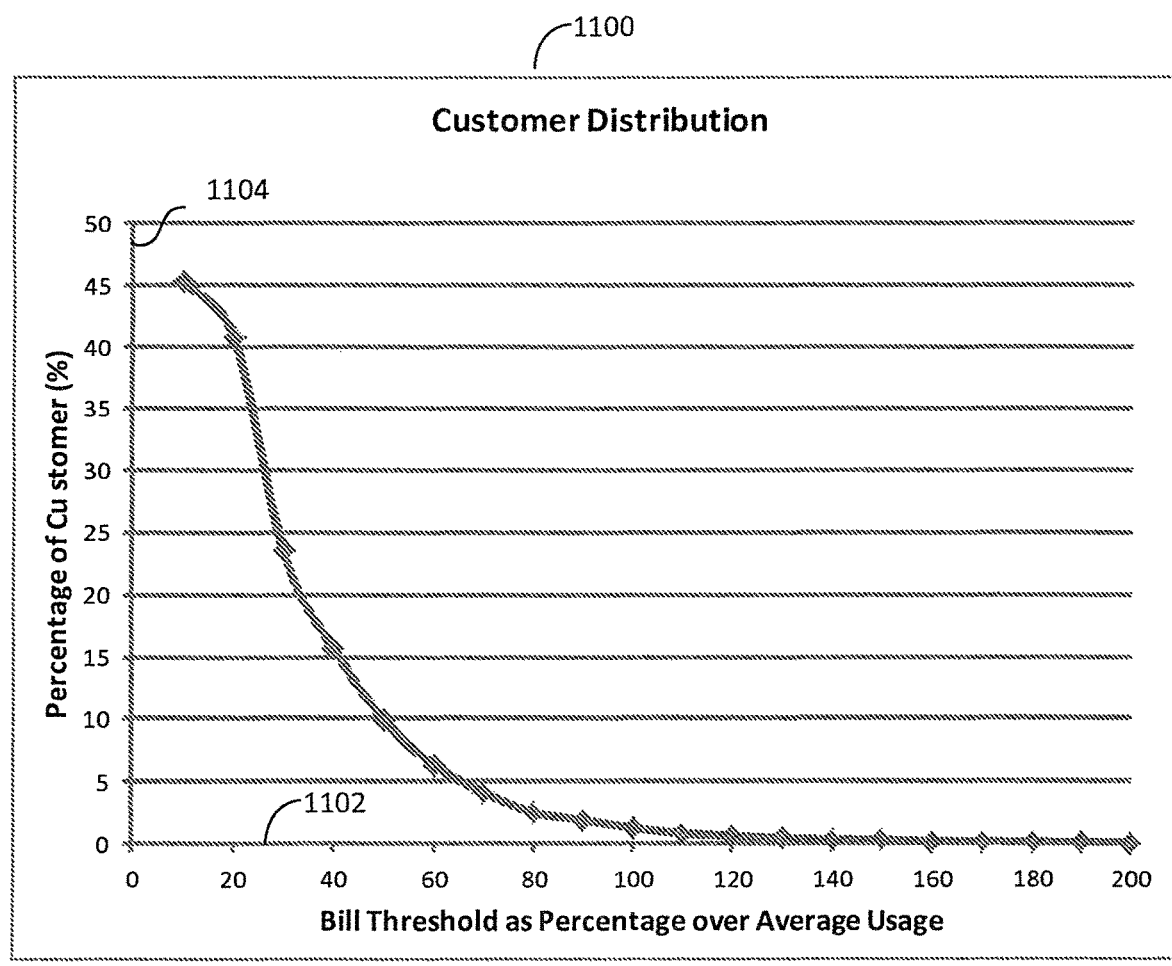
FIG. 11 illustrates a plot of a distribution of customers having usages exceeding their historical averages.

Threshold percentage is referred herein as the pre-defined threshold. The threshold percentage is preferable established around 130 percent. However it may vary between 100 percent and 200 percent. The consumer may receive recommendations of the setpoint to use and how it may correspond to various conservation efforts. FIG. 11 illustrates a plot 1100 of a distribution of customers having usages exceeding their historical averages. In the x-axis 1102, a percent of usage exceeding the historical averages is shown, Here, the data is analyzed between 0% and 200%. The percent of usage exceeding the historical averages refers to the threshold percentage. In the y-axis 1104, a percent of customer having a bill in a billing period that exceeds the threshold percentage is shown. As such, for a given threshold percentage, the computer system may determine the percentage of customers who may receive an alert. The historical average may be based on the customer's own usage history and may be compared based on the bill period (e.g., same month), Here, at a threshold percentage of 140%, approximately 15% of the customers have at least one bill that exceeds this threshold.

Alternatively, the $T_{percentage}$ value may be established such that fewer than three alerts are expected to be sent on average to each consumer. The $T_{percentage}$ value may also be established to maximize the number of consumers that would receive a report. For example, the threshold may be established by using a set of historical customer usage data for a given utility and determining the distribution of alert occurrences for different threshold levels. The distribution may be analyzed using a histogram. The $T_{percentage}$ value may be the threshold level with the maximum number of customers receiving at least one alert. The analysis may be performed across several seasons to reduce seasonal variability.

The baseline historical usage, $U_{historical}$, may be derived from past usage during similar seasonality. In the various embodiments, the past usage may correspond to usage from one year ago. The past usage data may be an average for the same month across different years.

The triggering condition 306 may include unusual or anomalous cost. Eqn. 3 defines such a triggering condition where the actual cost of the commodity, $C^i_{actual}$, exceeds the unusual cost profile, $C^i_{unusual}$, at "time i."

$$\text{Triggering condition} = C^i \text{actual} > C^i \text{unusual} \quad \text{(Eqn. 3)}$$

The unusual cost profile, C unusual, may be defined by Eqn. 4, where the profile is a baseline historical cost, $C_{historical}$, scaled by a threshold percentage, $T_{percentage}$. The profile may be linear over the number of days in the billing period, N.

$$C_{unusual}^i = \frac{C_{historical} \times T_{percentage}}{N} \quad \text{(Eqn. 4)}$$

Additionally, a consumer may personalize his or her threshold by providing a preference on the frequency of the alert. As a result, rather than an input of the threshold percentage, the system may provide options for a desired alert frequency, such as "normal", "more frequent", or "less frequent". Then based upon the selected desired alert frequency, the computer system may adjust a personalized threshold percentage $T_{percentage\_customer\_x}$ for a given customer X. For a normal alert frequency, the computer system may determine a $T_{percentage}$ value that would provide, for example, at least three alerts in a year. As such, a "more frequent" alert selection may correspond to a $T_{percentage}$ value that would provide an additional alert (e.g., four alerts). And a "less frequent" alert selection may correspond to a $T_{percentage}$ value that would provide fewer alerts (e.g., two alerts).

Figure 4:
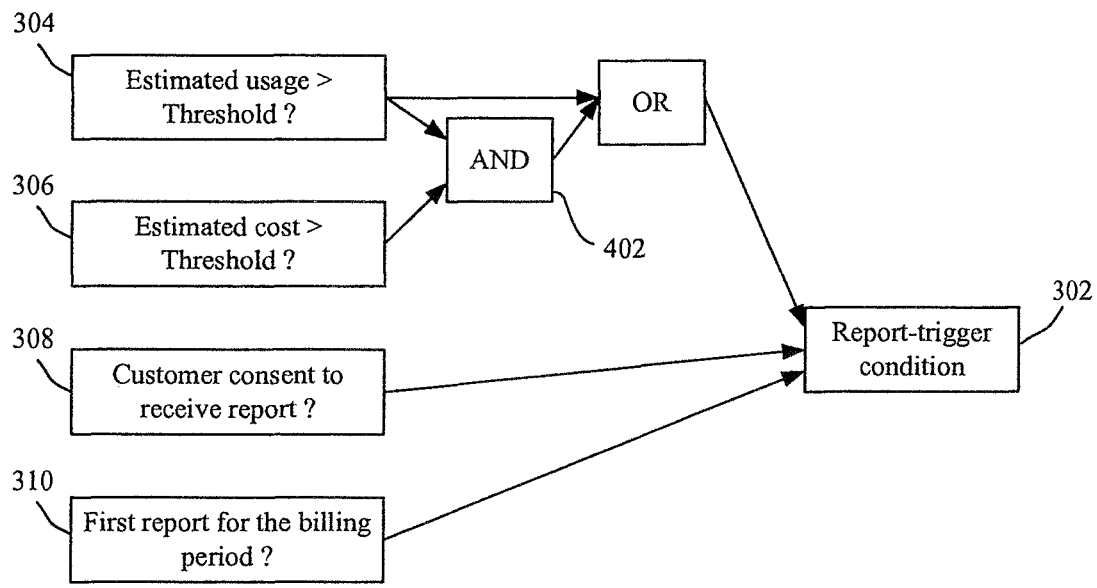
FIG. 4 is a diagram of report-trigger conditions according to an alternate embodiment.

FIG. 4 is a diagram of report-trigger conditions according to an alternate embodiment. The trigger condition for unusual cost may include both the cost and usage baseline exceeding a threshold. For example, the current billing period is May of Year 1. In May of Year 0, a consumer spent $100 for 100 kWh of electricity. For a threshold percentage of 130 percent, the triggering threshold may be established at $130 and 130 kWh. In this embodiment, for the triggering condition to be fulfilled, the estimated cost for the end of May would have to exceed $130 and that 130 kWh would have been used. Since the condition is based upon cost and usage, the system avoids reporting due merely to price fluctuations of the commodity. It should be appreciated by those skilled in art that differing threshold percentage values may be applied for cost and usage.

Alternatively, the unusual cost may be expressed in term of a change to environmental impact. Environmental impact may include, for example, carbon foot-print (shown in tons of carbon).

Environmental impact may also be expressed in terms of equivalents to other environmental quantities, for example, the number of miles driven, etc. Consumers may not understand their environmental impact based upon the tonnage of carbon that they generated, thus, the report may be alternatively expressed in relation to a more tangible reference. For example, the report may say that "the energy required to heat and/or to cool the home is equivalent to the consumer driving X number of miles." The report may also be expressed in a manner to promote conservation. For example, where the consumer has exceeded his or her usage, the report may suggest that the consumer should drive a certain number of miles in order to offset the environmental impact of the extra energy used to heat and/or cool the home.

The environmental benefits or impacts may be calculated using data stored in a look-up-table and applied to the cost and/or usage information. The computer system may use environmental benefits information as published by various government entities or other similar databases.

Referring back to FIG. 3, the report-trigger condition 302 may include permissive conditions, such as whether a consumer has given consent to receive the report 308 and whether the report will be the first report sent to the consumer during the current billing period 310. Permissive conditions may be referred to as eligibility conditions. Permissive conditions may promote the consumer's experience of receiving the reports. For example, in instances where the consumer did not provide consent to receive the report; the receipt of the report may cause confusion. Similarly, overly alerting the consumer may also result in the consumer Ignoring the report. Other permissive condition may include the consumer being a residential consumer.

Another permissive condition may include whether the unusual usage is detected in the middle of the billing period 312. For example, in a four-week billing period, a two-week monitoring window may be employed as a permissive or eligibility condition.

Referring back to FIG. 1, the method may determine 106 an estimated usage for the current billing period for the remaining portion of the current billing period and determine 108 whether the estimated usage fulfills the report-trigger condition, Upon the report-trigger condition being fulfilled, the method includes outputting 110 a report.

Figure 5:
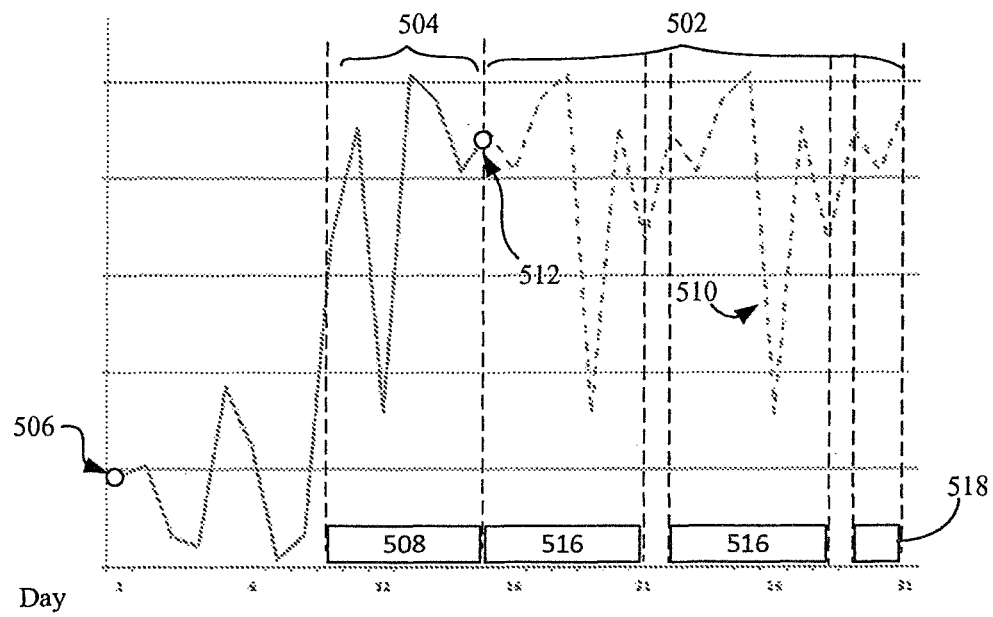
FIG. 5 illustrates aspects of forecasting of the consumer's usage for the remaining portion of the current billing period.

FIG. 5 illustrates aspect of forecasting the consumer's usage for the remaining portion of the current billing period. In various embodiments, the forecast of the consumer's usage for the remaining portion 502 of the current billing period may be based upon a trailing history 504 in the completed portion of the current billing period. The beginning 506 of the current billing period starts on Day 1 of the billing period. In this scenario, the current day 512 is Day 15. The remaining portion 502 of the current billing period is the remaining 16 days (Days 16-31) in a billing period of 31 days. When the trailing history 504 is longer than the completed portion of the current billing period, data from the previous completed billing period may be used. For example, at Day 2 of the May, the trailing history window may include Day 1 of May as well as the last six days of April.

In the various embodiments, the trailing history data 508 may be duplicated to serve as the forecast 510 for the remaining portion of the current billing period. Where the remaining portion 502 of the current billing period is longer than the trailing history 504, the trailing history data 508 may be duplicated multiple times to generate forecast data 516 and an end-of-the-forecast data 518. The end-of-the-forecast data 518 may be shorter than the forecast data 516 depending on the length of the remaining portion 502 of the current billing period. The forecast data 516 may be duplicated as a mirror of (i.e., reversed from) the trailing history data 508. This scheme provides more weight to the most recent usage data among the trailing history data 508, because the end-of-the-forecast data 518 is based on the most recent data from the trailing history data 508, Alternatively, the forecast data 516 may merely be duplicated in the same sequence as the trailing history data 508. Where the report explains the forecasting method to the consumer, this approach may be more easily understood by consumers.

In an embodiment, the trailing window data 508 may also be averaged to provide an average rate of usage. The average rate of usage may then be used to extrapolate the forecast usage for the remaining portion 502 of the current billing period.

For one embodiment, the inventors discovered that a seven-day to ten-day trailing window provides a reasonable usage estimation of the consumer's usage trend of up to a month. This window size beneficially accounts for the high and low usage during a time period, while also remaining in the same weather period. This window is also sufficiently small to not be affected by seasonality effects, which may skew the forecast.

It should be appreciated by those skilled in the art that longer or shorter trailing history may be employed without imparting from the disclosed embodiments. For example, by modeling weather patterns, the computer system may account for weather effects beyond the seven-to-ten days trailing window.

The computer system may determine 106 whether the estimated usage fulfills the report-trigger condition at predefined schedules during the current billing period. Where communicating meters are deployed, the meter may be read at one-minute, 15-minute, hourly, or daily increments. The operation may be performed to correspond to a new meter reading.

Figure 6:
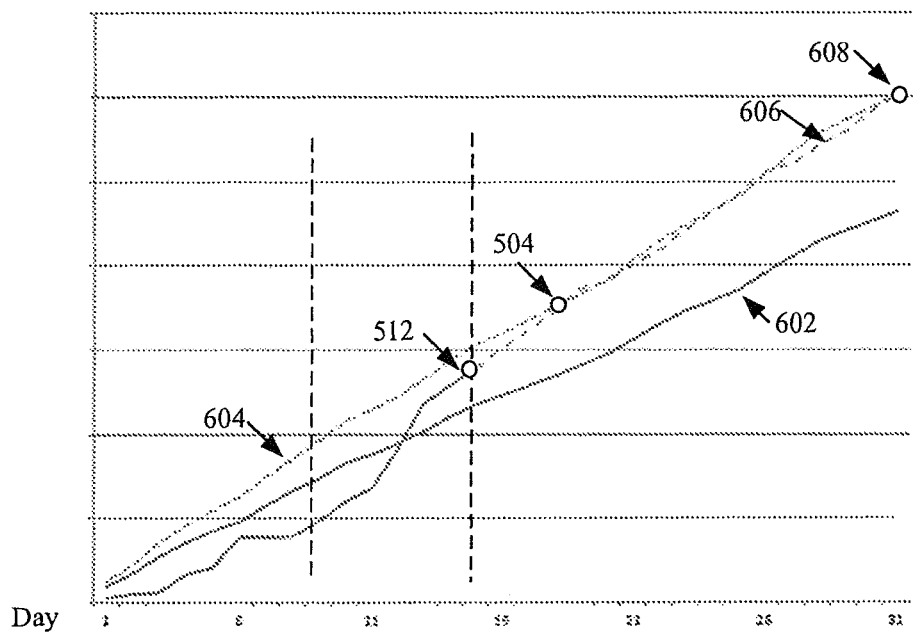
FIG. 6 is a diagram illustrating an operational aspect of the embodiments to determine, for each consumer, whether an estimated usage that has been established for the respective consumer for that current billing period fulfills the report-trigger condition.

Referring back to FIG. 1, the computer system determines 108 whether the estimated usage fulfills the report-trigger condition. FIG. 6 is a diagram illustrating an operational aspect of the embodiments to determine, for each consumer, whether an estimated usage that has been established for the respective consumer for that current billing period fulfills the report-trigger condition. In the various embodiments, the past usage data 602 is scaled by the $T_{percentage}$ cen value (for example, 130%) to establish a triggering threshold 604. In this example, at current day 512 (Day 15), the forecast usage 606 exceeds the triggering threshold 604 at Day 18, thus fulfilling the report-trigger condition.

Alternatively, the triggering condition may be based on the forecast usage 606 exceeding the triggering threshold 608 established at the end of the billing period. As shown, an unusual usage pattern by a consumer is detected within a few days of the elevated usage beginning. As such, the consumer has time to take action to curb their usage or spending.

A component of the estimated usage may include its duration, which establishes the length of the billing period. In the various embodiments, the current billing period may have a duration based on an average of three billing periods. Other forecast lengths may be employed, such as a fixed length.

In operation 110, the computer system outputs a report upon the report-trigger condition being fulfilled, indicating an unusual usage or unusual usage pattern by the consumer is detected. The report may be formed in different ways. For example, it may include generating an electronic message, which may be an electronic mail message, a short message service (SMS) message, and/or an automated voice message. The report may be sent directly to consumers via such electronic messages. The report may also be sent to intermediaries, such as the utility companies or a service provider. The report may also be signals send to an electronic device located at a location associated with the consumer, such as a meter or a thermostat. The meter may be an advanced meter infrastructure (AMI) based meter or a meter with communication capabilities over a network.

The message may be personalized. The personalization provides greater confidence to the consumer that the information is relevant. For example, the personalization may include the alert type (unusual usage or cost), fuel type, as well as tips and education material to reduce usage. As a result, the likelihood of the consumer taking action increases such as to reduce usage.

The message may be formatted for electronic mail as shown in Table 1.

TABLE 1

Email subject:
Unusual <electric/natural gas> usage
Header info: Text here is the same for all cases, unless noted

| Text | | Description |
| --- | --- | --- |
| Intro stmt | You're receiving this alert to help you keep your bills low. Unsubscribe | Short term: this links to SmartSource for the user to opt-out of all emails from Opower<br>Long term: Would be great if this could either link to astro or a configuration page so that you don't need to opt-out of all Opower emails (e.g. reports and unusual usage alerts) |
| Account number | Acct # ******XXXX | show asterisks for most digits. Only showing actual last 4 digits |
| Alert title | Unusual <electric/natural gas> usage | This is the same as the email subject |
| Budget bill statement | This is not a bill: You're on budget billing. | Only shown for customers on budget billing. Otherwise should be omitted. |

For short message service (SMS) message, the report may say "UTILCO: based on your recent Electric use, your projected bill is $102. Tip: Adjust the temp 3-5 F to lower your bill." The report may also say "UTILCO: Your recent Electric use is 14% higher than typical tar you this time of year. Tip: Adjust the temp 3-5 F to lower your bill."

The report may include literature to improve usage reduction. The literature may include tips as shown in Table 2.

TABLE 2

| Electricity (summer and winter) | Impact | Natural Gas (summer and winter) | Impact |
| --- | --- | --- | --- |
| Steps to take | | <same> | |
| Turn off unused lights & devices | 1/5 | Shave a minute off shower time | 1/5 |
| Clean or replace air filters monthly | 3/5 | Clean or replace air filters monthly | 3/5 |
| Adjust your thermostat 3-5° | 5/5 | Adjust your thermostat 3-5° | 5/5 |
| See more ways to save | | <same> | |

The consumer may also customize the settings for the report, such as the thresholds (maximum or minimum), as well as the maximum number of alerts to be received per billing period. The consumer may also indicate preferences on the method of delivery of the report.

Figure 12:
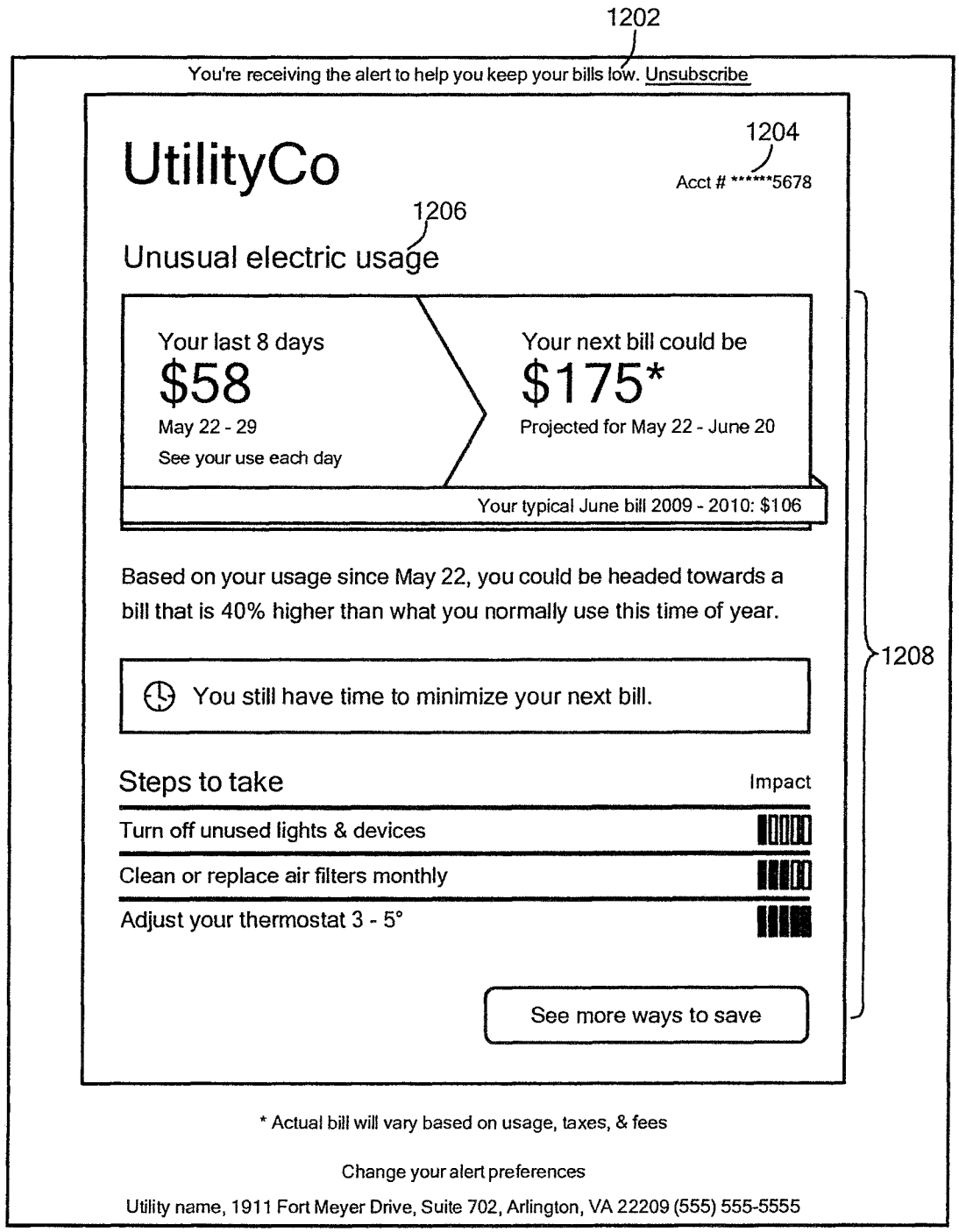
FIG. 12 illustrates an electronic mail report according to an illustrative embodiment.

FIG. 12 illustrates an electronic mail report according to an illustrative embodiment. As shown, the report includes the introductory statement 1202, the account number 1204, the alert title 1206, and the literature to improve usage reduction 1208.

The described method may be configured to monitor large numbers of consumers while distinguishing unusual usage from ordinary usage that is subject to ordinary fluctuations. In enabling consumers to manage their commodity use, the various embodiments provide for incremental efficiency results as well as greater consumer satisfaction. Additionally, the method may improve the user experience in ensuring that as many people as possible receive alerts and that the alert would be relevant and useful to them. This configuration may entail balancing the frequency of reporting with the frequency of false-positive condition when establishing the triggering threshold.

Figure 7:
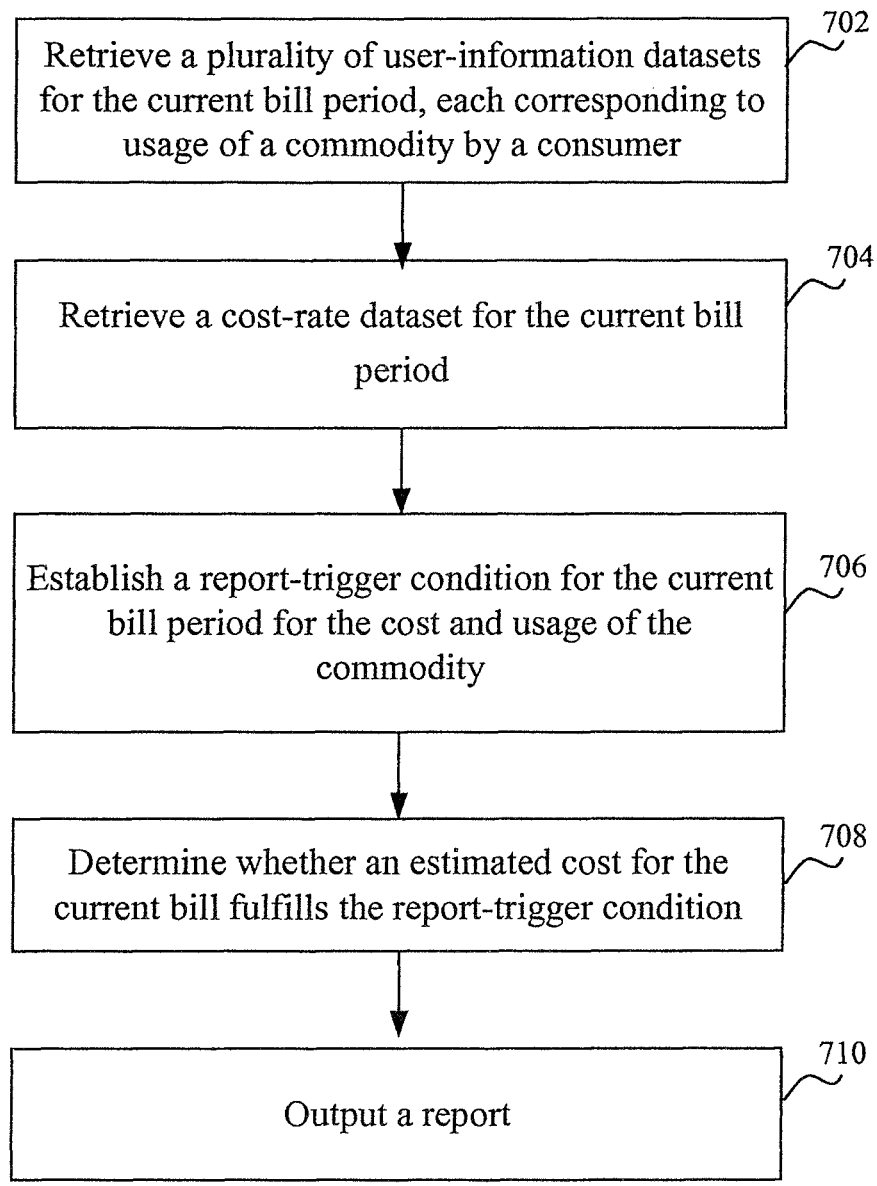
FIG. 7 is a flowchart of a computer-implemented method of reducing a usage or cost of a commodity by reporting to a consumer of unusual cost according to an alternate embodiment.

FIG. 7 is a flowchart of a computer-implemented method of reducing a usage or cost of a commodity by reporting to a consumer of unusual cost according to an alternate embodiment.

A computer system may retrieve usage-information dataset corresponding to the usage of the commodity by the consumer 702, the usage-information dataset including past usage of the commodity during at least one of a completed billing period and a current usage of the commodity during a completed portion of the current billing period. The computer system may retrieve a cost-rate dataset for the current billing period 704. The cost-rate dataset may include tiered rates as well as peak and off-peak pricing.

The computer system may establish a report-trigger condition for the current billing period; the report-trigger condition being based from the past usage in the usage-information dataset 706. The computer system may determine whether an estimated cost for the current billing period fulfills the report-trigger condition 708 and outputs a report to the consumer 710 upon such conditions.

Figure 8:
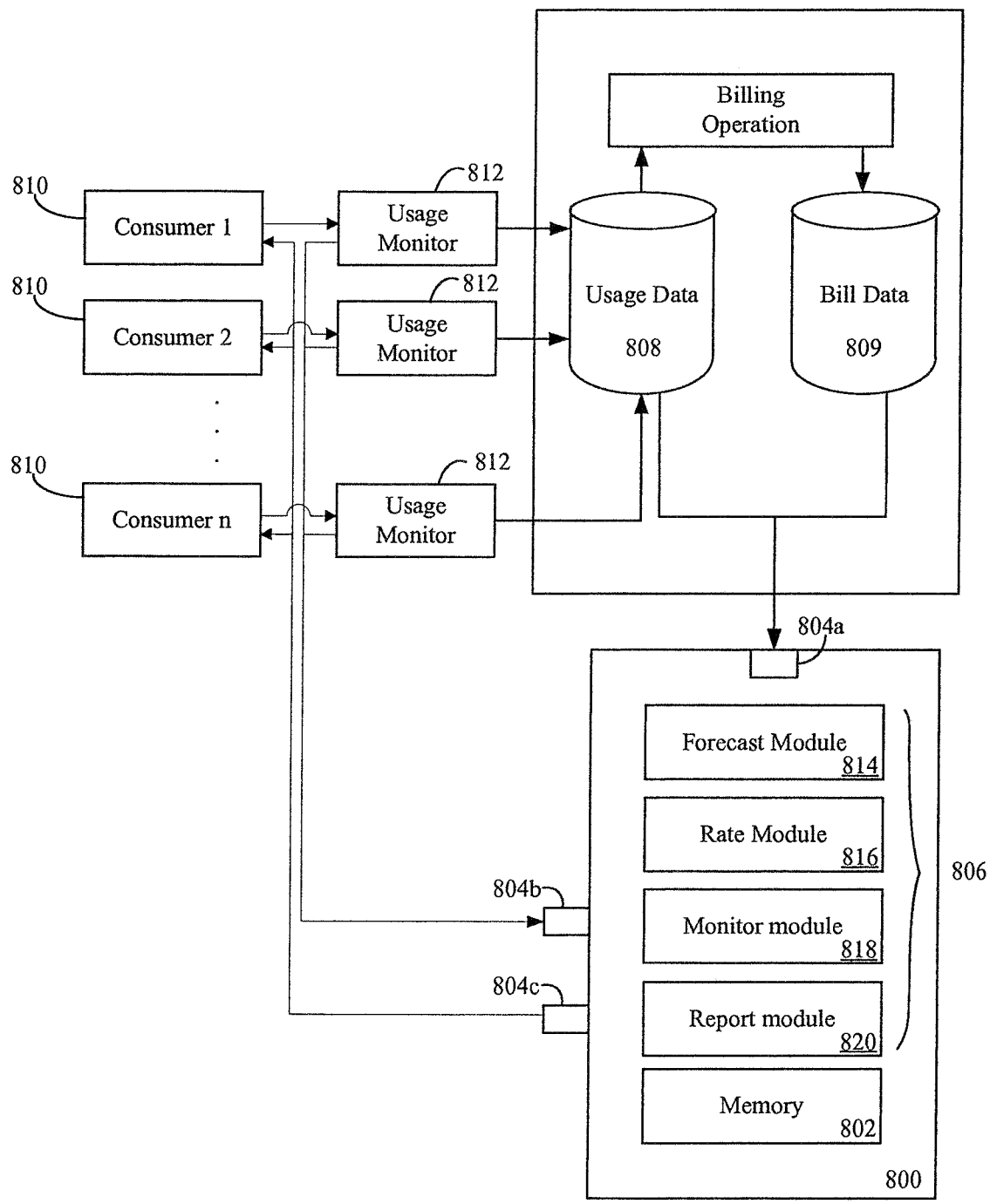
FIG. 8 is a diagram of a system according to the illustrative embodiment.

FIG. 8 is a diagram of a system according to the illustrative embodiment. The system reduces a usage or cost of a commodity by reporting to a consumer of an unusual cost or spending directed to use of a commodity. The system 800 includes a memory 802, communication ports 804 a-c, and a control program 806.

The memory 802 is configured to store usage data 808 associated to a commodity. The usage data may include, in part, a usage-information dataset corresponding to usage of the commodity by a plurality of consumers. The usage-information may include, in part, past usage-information of the commodity during at least one of completed billing period and a current usage of the commodity during a completed portion of the current billing period. The past usage data may include bill data 809. The communication port 804 c may be configured to transmit report data to a set of consumers 810, while the communication port 804 a is configured to receive data with the utility database. The control program 806 is configured to control the memory 802 and the communication ports 804 a-c. The control program 806 may include a forecast module 814, a rate module 816, a monitor module 818, and a report module 820. The control program 806 may also retrieve the usage-information dataset for a consumer, via communication port 804 b that interfaces directly to meters 812. The control program 806 may establish a report-trigger condition for the current billing period for the consumer, where the report-trigger condition may be based at least in part from the past usage in the usage-information dataset. The control program 806 may determine an estimated usage for the current billing period based at least, in part, on usage for the completed portion of the current billing period and a forecast of usage for a remaining portion of the current billing period. The forecast of the usage may be generated by the forecast module 814. The control program 806 may continuously determine whether the estimated usage fulfills the report-trigger condition using the monitor module 818. If the estimated usage fulfills the report-trigger condition, the monitor module 818 may cause the report module 820 to output a report to the consumers 810 through the communication port 804 c.

The communication ports 804 b may be configured to interface to a meter, a thermostat, a data exchange interface of a cellular network, and other networks.

It should be appreciated by those skilled in the art that the communication ports 804 a-c may be implemented individually or in combination. For example, the communication ports may be combined to a single Internet port that interface to a local area network. The various communication ports may be implemented on several servers that interface to the respective networks. For example, the communication port 804 b may be a server that interfaces to utility meter. One example is a gateway FTP server to interface with utilities servers to avow for the transfer of data files. The communication port 804 c may be implemented as an exchange server, such as UUA for short message service (SMS) gateways, electronic mail (email) using simple mail transfer protocol (SMTP), as well as interactive voice response (IVR). Application programming interface (API) may, for example, be used to control IVR and SMS.

Figure 9:
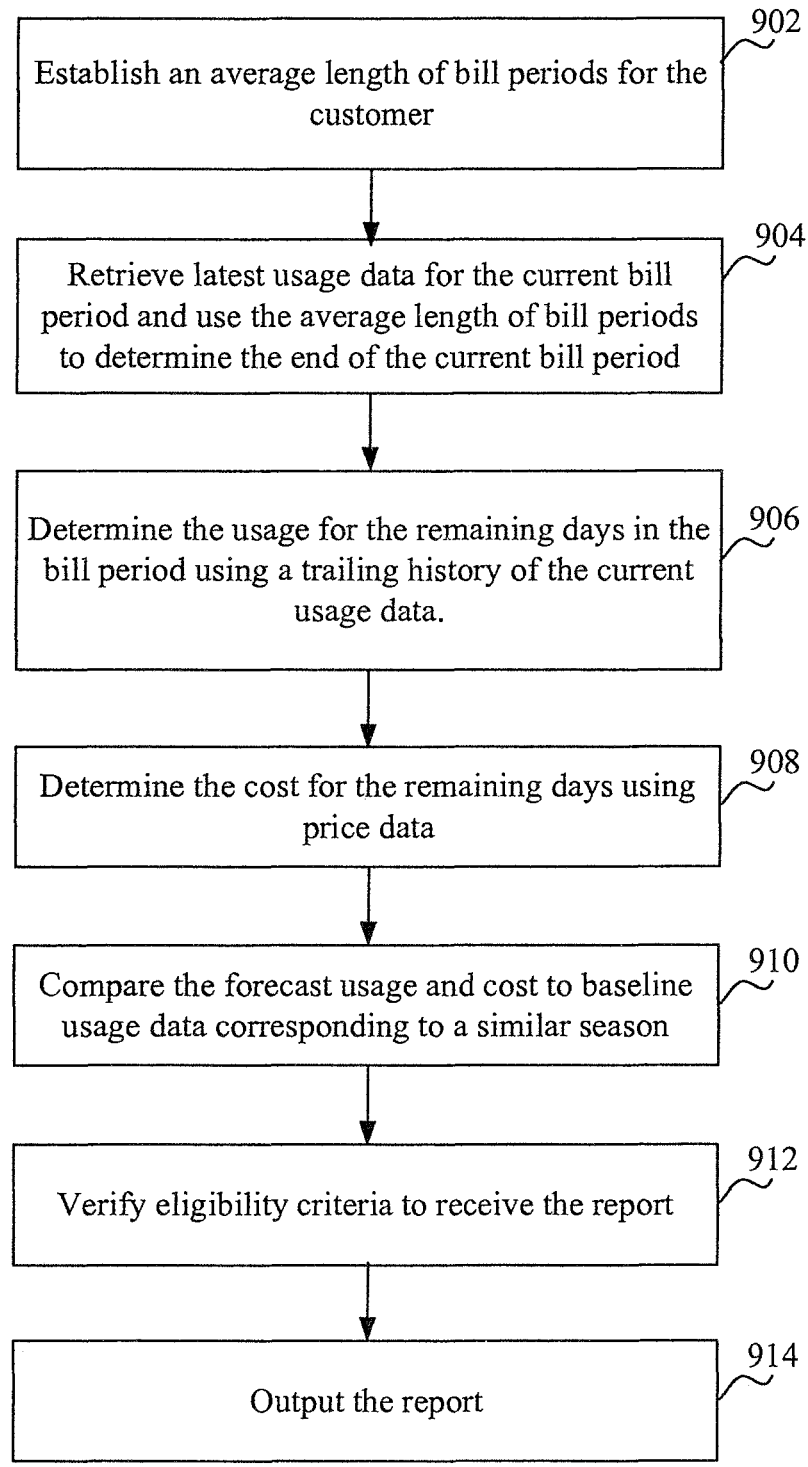
FIG. 9 shows a flowchart of a computer-implemented method according to an alternate embodiment.

FIG. 9 shows a flowchart of a computer-implemented method according to an alternate embodiment. A computer system may establish an average length of billing periods for the customer 902 to determine the end of the current billing period. For example, the average length of the bill periods may be between 28-31 days where the current bill period is monthly. The average length of the bill periods may be based on old bills including the past three billing periods up to the past twelve. In instances where less than three old bills exist, the computer system may use a default value provided by the utility company. The average length of the billing periods may be used to filter anomalously short billing periods, which may occur for new customers. As discussed, a bill period may be monthly, but other durations may be employed, including, for example, 45-days, 60-days, and 90-days.

The computer system may retrieve a usage data for the current billing period 904 to establish the end date of the current billing period. The computer system may retrieve the last billing usage read to determine the start date of the current billing period and average the billing period to project the end date of the current billing period.

The usage data may be in the data format as shown in Table 3

TABLE 3

| | Rates modeled text | Not modeled text |
| --- | --- | --- |
| Recent data header | Your last X days | <same> |
| Recent data | $XXX | XXX <kWh/therms/CCF> |
| Recent data date range | Mmm DD-Mmm DD | <same> |
| Link to astro: | View your usage | <same> |

The computer system may determine the usage for the remaining days in the billing period 906 by determining the usage to date of the current billing period and forecasting the remaining days in the current billing period. The forecasting may be based on the trailing window of the usage that may be between seven to ten days.

The computer system may use tiered rates, or peak and off-peak pricing to determine a projected cost for the remaining portion of the billing period 908. The computer system may store to a database the projected billing period, the usage and cost to date, the forecasted usage and cost.

The computer system may compare the forecast to a baseline to determine whether an unusual usage exists 910. The unusual usage may be defined as a baseline value, established from old bills of similar seasons, exceeding a defined threshold. If the condition is fulfilled, the computer system may verify the eligibility criteria to ensure the customer has opted in to receive the alerts, that the customer is residential, and that the report would be sent during the middle of the billing period 912. The unusual usage may be based on cost or usage. If cost is the trigger, the report may be outputted only if both the usage and cost threshold are exceeded 914. This condition would discount the effect of price increases, rather than usage increase.

Figure 10:
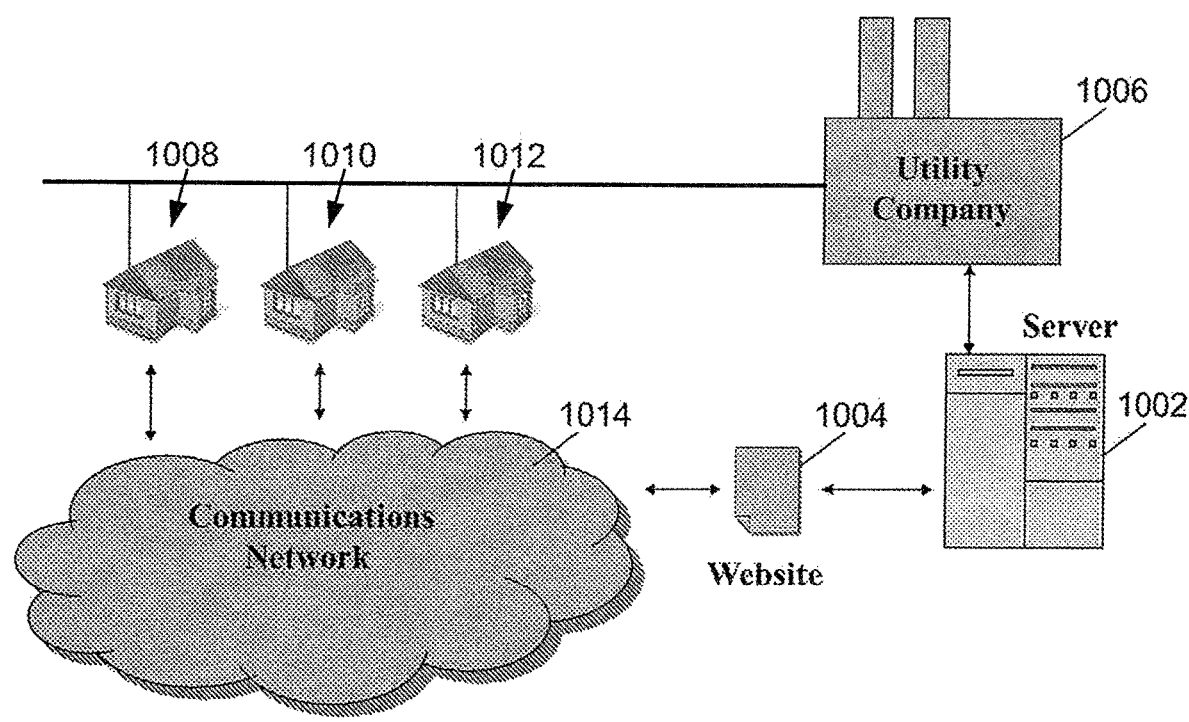
FIG. 10 shows embodiment according to the described illustrative embodiment.

FIG. 10 shows embodiment according to the described illustrative embodiment. The server 1002 receives data (i.e., historical and usage information) from the utility 1006. The server 1002 performs the computer-implemented method described above. If a report-trigger condition is satisfied, the server 1002 may communicate the information to consumers associated with those buildings 1008, 1010, and 1012. In various embodiments, the server 1002 communicates the report, or the alert, via the communications network 1014. For example, the server 1002 may send the report and/or alert in an e-mail. Alternatively, the consumer may log into a server supporting website 1004 and view the alert or the personalized message corresponding to the report. In addition, the server 1002 may print the report or may provide the information to a printing system so that the data can be provided to the consumer via regular mail (e.g., as part of a utility bill). In other embodiments, the report/alert is communicated back to the utility company 1006 so that the utility company 1006 can provide the report/alert to the consumer 1008, 1010, and 1012.

It should be noted that terms such as "processor" and "server" may be used herein to describe devices that may be used in certain embodiments of the present system and should not be construed to limit the present system to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

The various components of the control program may be implemented individually or in combination. For example, each component may be implemented or a dedicated server or a set of servers configured in a distributed manner.

It should also be noted that devices may use communication protocols and messages (e.g., messages created, transmitted, received, stored, and/or processed by the system), and such messages may be conveyed by a communication network or medium. Unless the context otherwise requires, the present system should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the system or method, and should not be construed to limit the present system or method to any particular logic flow or logic Implementation. The described logic may be partitioned into different logic blocks programs, modules. Interfaces, functions, or subroutines) without changing the overall results or otherwise departing from the true scope of the system or method. Often times, logic elements may be added, modified, omitted, performed in a different order, or implemented using different logic constructs (e.g., logic gates, looping primitives, conditional logic, and other logic constructs) without changing the overall results or otherwise departing from the true scope of the present disclosure.

The present system or method may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other programmable logic device (PLD)), discrete components, integrated circuitry (e.g., an Application Specific Integrated Circuit (ASIC)), or any other means including any combination thereof. In a typical embodiment of the present system or method, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the systems or method may be implemented as a combination of both software (e.g., a computer program product) and hardware. Still other embodiments may be implemented as entirely hardware, or entirely stored software.

The embodiments described above are intended to be merely exemplary; numerous variations and modifications will be apparent to those skilled in the art. All such variations and modifications are intended to be within the scope of the claims.

What is claimed is:

1. A computer-implemented method comprising:
retrieving, using one or more processors, a plurality of usage-information datasets, each usage-information dataset corresponding to usage of the commodity by a consumer including past usage of the commodity;
generating, using the one or more processors, a distribution of predicted alert occurrences across a plurality of potential threshold levels using a set of historical customer usage data for the commodity from the plurality of usage-information datasets;
analyzing, using the one or more processors, the distribution of predicted alert occurrences to select a first threshold level from amongst the plurality of potential threshold levels based at least in part on a determination that the first threshold level is predicted to, upon implementation as a report-trigger condition for a set of consumers, provide for at least one alert being sent to a maximum number of consumers of the set of consumers;
establishing, using the one or more processors, a plurality of report-trigger conditions, each report-trigger condition corresponding to a consumer and based at least in part on a specified percentage of a baseline of the past usage, the specified percentage corresponding to the first threshold level; and
in response to determining, using the one or more processors, that an estimated usage established for a first consumer fulfills a first report-trigger condition, of the plurality of report-trigger conditions:
generating an electronic message including information indicating that an unusual usage of the commodity has been detected; and
controlling transmission of the electronic message, via a network connection, to an electronic device associated with the first consumer to provide the information indicating the unusual usage of the commodity.

2. The computer-implemented method of claim 1, wherein the selecting the first threshold level is based at least in part on a determination that the first threshold level is predicted to be associated with less than a threshold number of alerts to be sent on average to each consumer.

3. The computer-implemented method of claim 1, wherein the selecting the first threshold level is based at least in part on a determination that the first threshold level is predicted to be associated with more than a threshold number of consumers receiving at least one alert.

4. The computer-implemented method of claim 1, wherein the past usage is defined as during a period in a season that corresponds to a season of a current billing period.

5. The computer-implemented method of claim 4, wherein the plurality of report-trigger conditions comprise, for each consumer, the estimated usage for the remaining portion of the current billing period exceeding 130 percent of the past usage during a corresponding period.

6. The computer-implemented method of claim 1, wherein the electronic device includes a meter or a cell phone.

7. The computer-implemented method of claim 1, wherein the electronic message includes at least one of or a combination of messages:
an electronic mail message, a short message service (SMS) message, an automated voice message, or an electronic signal.

8. The computer-implemented method of claim 1, wherein the first report-trigger condition is based at least in part on at least one of:
usage of the commodity by the first consumer, or
a present cost of the commodity.

9. The computer-implemented method of claim 1, wherein determining whether the estimated usage fulfills the first report-trigger condition is performed after half of a current billing period has transpired, wherein the current billing period is at least four weeks in duration.

10. The computer-implemented method of claim 1, wherein determining whether the estimated usage fulfills the first report-trigger condition is performed after a pre-defined time within a current billing period.

11. The computer-implemented method of claim 1, wherein the unusual usage is during a current billing period, wherein the current billing period has a duration based at least in part on at least one of:
an average of durations between three billing periods and twelve completed billing periods, or a default period.

12. The computer-implemented method of claim 1, wherein the threshold number is three or more.

13. The computer-implemented method of claim 1, wherein the plurality of report-trigger conditions includes, for each consumer, a data-value representing the consumer consenting to receiving the electronic message.

14. The computer-implemented method of claim 1, wherein the electronic message displays the unusual usage of the commodity as indicia of at least one of high cost, high usage, high environmental impact, or high carbon footprint.

15. A non-transitory machine-readable medium comprising program code stored thereon for execution by one or more processors, the program code configured to, when executed, cause the one or more processors to:
retrieve a plurality of usage-information datasets, each usage-information dataset corresponding to usage of the commodity by a consumer including past usage of the commodity;
generate a distribution of predicted alert occurrences across a plurality of potential threshold levels using a set of historical customer usage data for the commodity from the plurality of usage-information datasets;
analyze the distribution of predicted alert occurrences to select a first threshold level from amongst the plurality of potential threshold levels based at least in part on a determination that the first threshold level is predicted to, upon implementation as a report-trigger condition for a set of consumers, provide for at least one alert being sent to a maximum number of consumers of the set of consumers;
establish a plurality of report-trigger conditions, each report-trigger condition corresponding to a consumer and based at least in part on a specified percentage of a baseline of the past usage, the specified percentage corresponding to the first threshold level; and
in response to determining that an estimated usage established for a first consumer fulfills a first report-trigger condition, of the plurality of report-trigger conditions:
generate an electronic message including information indicating that an unusual usage of the commodity has been detected; and control transmission of the electronic message, via a network connection, to an electronic device associated with the first consumer to provide the information indicating the unusual usage of the commodity.

16. The non-transitory machine-readable medium of claim 15, wherein each of the report-trigger conditions is based at least in part on a forecast usage of the commodity by a consumer exceeding a pre-defined cost threshold.

17. The non-transitory machine-readable medium of claim 15, wherein determining whether the estimated usage fulfills the first report-trigger condition is performed after half of a current billing period has transpired, wherein the current billing period is at least four weeks in duration.

18. The non-transitory machine-readable medium of claim 15, wherein determining whether the estimated usage fulfills the first report-trigger condition is performed after a pre-defined time within a current billing period.

19. A system comprising:
a memory configured to store data;
one or more processors coupled to the memory;
a communication port coupled to the one or more processors; and
a control program configured to:
control, using the one or more processors, the memory and communication port;
retrieve, using the one or more processors, a usage-information dataset for a consumer including at least usage data for a commodity;
generate, using the one or more processors, a distribution of predicted alert occurrences across a plurality of potential threshold levels using the usage-information dataset, each potential threshold level associated with a predicted number of alert occurrences;
analyze, using the one or more processors, the distribution of predicted alert occurrences to select a first threshold level from amongst the plurality of potential threshold levels based at least in part on a determination that the first threshold level is predicted to, upon implementation as a report-trigger condition for a set of consumers, provide for at least one alert being sent to a first number of consumers of the set of consumers;
establish, using the one or more processors, a report-trigger condition for the consumer, the report-trigger condition based at least in part on a specified percentage of a baseline defined from past usage of the commodity in the usage-information dataset, the specified percentage corresponding to the first threshold level; and
determine, using the one or more processors, that an estimated usage for the consumer fulfills the report-trigger condition and in response thereto:
generate and provide for display to an electronic device associated with the consumer, an electronic message including information to reduce usage of the commodity.

20. The system of claim 19, wherein the communication port is configured to interface, via at least one network connection, at least in part to at least one of a meter, a thermostat, a network, a data exchange interface of a cellular network or a data exchange interface to an email server.

* * * * *